United States Patent [19]

Fukui

[11] Patent Number: 4,614,981
[45] Date of Patent: Sep. 30, 1986

[54] APPARATUS FOR REPRODUCING VIDEO SIGNAL

[75] Inventor: Tsutomu Fukui, Tokyo, Japan

[73] Assignee: Asahi Kogaku Kogyo Kabushiki Kaisha, Tokyo, Japan

[21] Appl. No.: 759,913

[22] Filed: Jul. 29, 1985

Related U.S. Application Data

[63] Continuation of Ser. No. 456,117, Jan. 6, 1983, abandoned.

[30] Foreign Application Priority Data

Feb. 10, 1982 [JP] Japan .................................. 57-18831

[51] Int. Cl.⁴ ............................................. H04N 5/95
[52] U.S. Cl. ................................... 358/337; 360/36.1
[58] Field of Search ......................... 358/337; 360/36.1

[56] References Cited

U.S. PATENT DOCUMENTS

| 3,959,815 | 5/1976 | Rotter | 360/70 |
| 4,133,009 | 1/1979 | Kittler | 360/11.1 |
| 4,228,460 | 10/1980 | Rotter | 358/337 |
| 4,291,344 | 9/1981 | Kimura | 360/36.1 |
| 4,353,089 | 10/1982 | Winslow | 360/36.1 |

FOREIGN PATENT DOCUMENTS 55-58681  5/1980  Japan .................................. 358/337

Primary Examiner—Alan Faber
Attorney, Agent, or Firm—Browdy & Neimark

[57] ABSTRACT

An apparatus for reproducing a video signal by detecting a video signal recorded on a rotary recording medium. The apparatus includes a variable delay for inputting and delaying a detected video signal, a phase comparator for comparing each phase of a timing signal, such as a horizontal sync signal, or the like, obtained from input and output sides of said variable delay, and a voltage-controlled oscillator for controlling a delay period of a variable delay receiving the output of a comparator.

1 Claim, 1 Drawing Figure

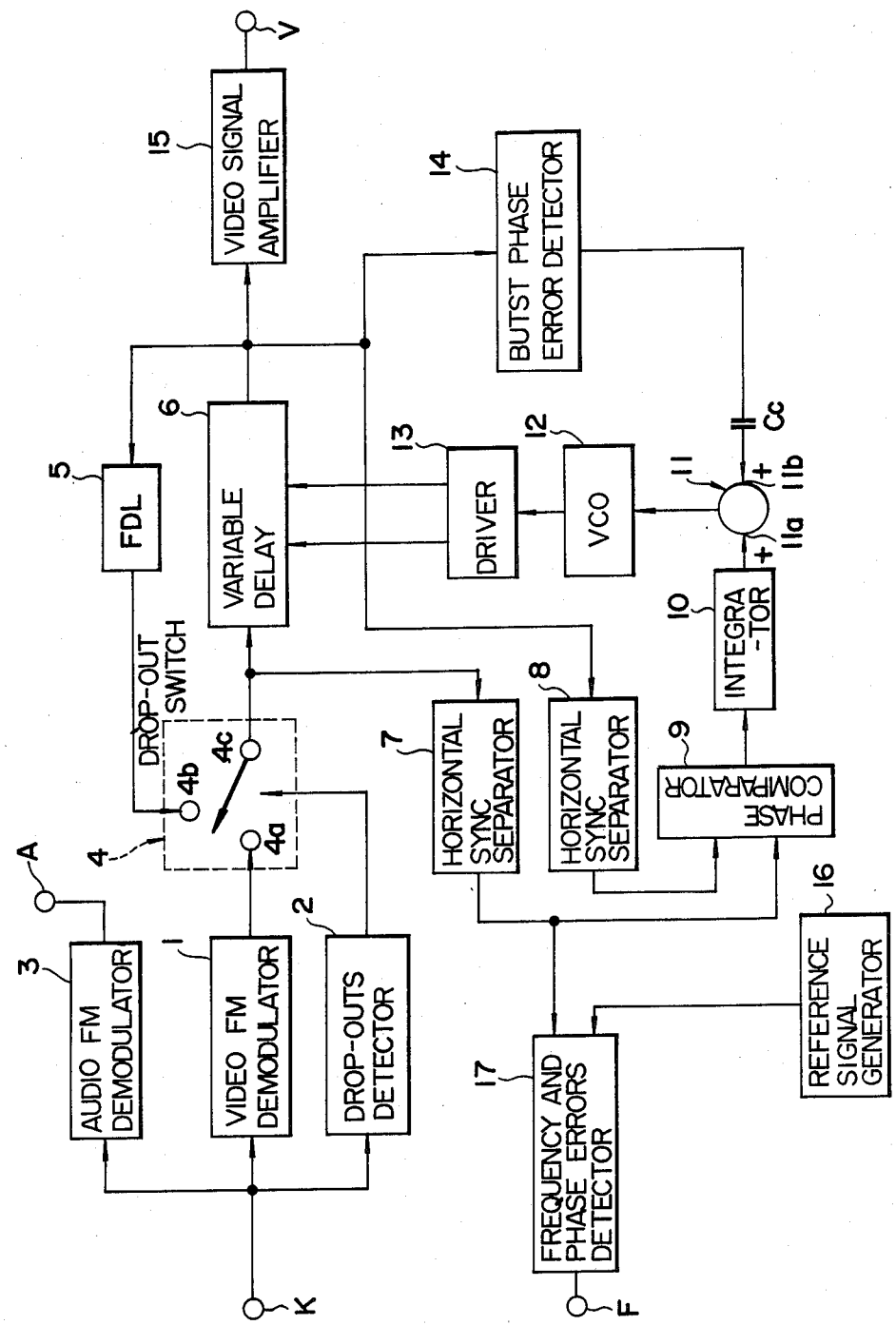

APPARATUS FOR REPRODUCING VIDEO SIGNAL

This invention relates to an apparatus for reproducing a video signal obtained by detecting a video signal from a rotary recording medium such as a video disc or a video tape.

A video FM signal detected from the video disc or the like generally contains drop-outs which cause noise components and also time-axis errors due to the eccentricity of the video disc, defectiveness of the mechanical precision of video disc mounting section (spindle run-out) and so on. Thus, video signal processing which corresponds to drop-outs and time-axis errors should be made to obtain a good reproduced image.

There is known various means for processing these video signals such as one disclosed in Japanese Patent Laid-open application No. 55-58681. The disclosed means is provided with a closed loop system, in which a burst signal in a video signal and a reference frequency signal are phase compared and a time-axis error signal that is obtained as a result of the phase comparison is fed a variable delay. Means is also provided with an open loop system, in which the horizontal sync signal in a video signal and the reference frequency signal are phase compared and a time-axis error signal which is obtained as a result thereof is added to an error signal of the closed loop system, the sum of signals added together being supplied to the variable delay.

The use of the closed loop system permits fine time-axis error compensation and the use of the open loop permits rough time-axis error compensation.

With this prior art system, it is possible to avoid the use of a multiplex closed loop system which requires a high gain. However, to extend the range of delay while permitting modulation requires an increase of delay stages of the CCD (charge coupled device) or the like which consists a variable delay circuit because of the characteristics thereof. This is undesired from the standpoints of manufacturing and cost. Further, the rough time-axis error compensation causes undesired DC variable components to be introduced in the video signal after compensation, thus giving rise to the flicker in the reproduction of image. Further, to compensate for drop-outs, a drop-out compensator, consisting of a 1H delay line for delaying a video signal for one horizontal sync period (i.e., 1H) has to be provided.

Such a 1H delay line, however, consists of a supersonic delay element using glass as a propagation medium and is very expensive. Besides, the transmission bandwidth of the signal due to the 1H delay line is about 1.5 MHz and is not suitable for transmitting a color video signal. Further, it requires the separate video demodulation system on 1H delay side and it is impossible to effect compensation for drop outs longer than 1H period due to the circuit structure.

SUMMARY OF INVENTION

The present invention is intended to overcome the above problems encountered in the prior art. According to the present invention, in an apparatus for reproducing a video signal by detecting a video signal recorded in a recording medium, a servo loop is constructed in which the detected video signal is input into the variable delay circuit, VCO (voltage controlled oscillator) is controlled by the control amount corresponding to the phase difference between each horizontal sync signal obtained from input and output sides of this variable delay circuit and the variable delay circuit is clock controlled by the VCO output. The delay signal that is obtained with this consturction has always correct delay amount and it can be used for many purposes such as fine control of the time-axis, compensation for drop-outs, etc. The present invention is for providing the apparatus for reproducing a video signal, which has a simple construction and precise and stable operation.

BREIF DESCRIPTION OF THE DRAWING

The Figure is a block diagram showing the embodiment of the present invention.
6—Variable delay
7,8—Horizontal sync separator
9—Phase comparator
VCO—Video controlled oscillator

DESCRIPTION OF ILLUSTRATIVE EMBODIMENT

Now, an embodiment of the present invention will be described.

Detected FM signal is detected from a video disc, which is not shown in the figure and this detected FM signal is supplied to an input terminal K. The detected FM signal may be a frequency-modulated signal containing color video data based on a conventional NTSC system. The detected FM signal supplied to the input terminal K is demodulated by a video FM demodulator 1 to produce a video signal. The detected FM signal is also fed to a drop-out detector 2 to detect instants of drop-outs in the detected FM signal. Further, the detected FM signal is supplied to the FM demodulator 3 and the demodulated audio signal output is obtained from an output terminal A.

The drop-out detector 2 controls a drop-out switch 4. The switch 4 is switched to an input terminal 4b at a time of a drop-out of the demodulated video signal fed to an input terminal 4a. The output terminal 4c of the drop-out switch 4 is connected to the variable delay 6. For instance, 1H delay period can be obtained by this variable delay 6. The variable delay 6 may be separated into two parts and each part may get ½H delay period. The demodulated signal having passed through the variable delay 6 is fed through a video signal amplifier 15 to a video signal output terminal V.

A reproducing apparatus such as a television monitor may be connected to the output terminal V to obtain image reproduction. The variable delay 6 consists of analog signal delays such as CCDs or BBDs (bucket brigade device). Their respective delay periods may be changed according to the transfer clock frequency.

Horizontal sync separator 7 and 8 are connected to the input side and output side of the variable delay 6 respectively to obtain a horizontal sync signal as a timing signal contained in a video signal. These horizontal sync signals are fed to the phase comparator 9 to detect their timing errors. The output of the phase comparator circuit 9 becomes 0 when the delay period of the variable delay 6 coincides with 1H of the demodulated video signal. When a delay period is deviated from 1H, the output of the phase comparator 9 is obtained according to error periods. The output of the phase comparator circuit 9 is fed to the adder's input terminal 11a through an integrator 10 to limit its frequency characteristics to a super low D.C. range.

The output of adder 11 is fed to VCO 12 and variable delay 6 is clock-controlled through driver 13 by this VCO. Driver 13 converts a single clock signal input from the VCO 12 at the TTL level (transistor transistor logic) into multiple timing pulse. It serves as an interface for driving variable delay 6.

Variable delay 6, horizontal sync separator 7 and 8, phase comparator 9, integrator 10, adder 11, VCO 12 and driver 13 form a servo loop, in which the timing difference of a horizontal sync signal on the input and output sides of variable delay 6 is detected to control the oscillation frequency of VCO 12 so that the timing difference becomes 0, and the delay period of variable delay 6 is servo-controlled. That is, a delay period is always kept identical to the 1H period of a demodulated video signal which passes through variable delay 6.

The delayed output of the variable delay 6 is fed back to the other terminal 4b of the drop-out switch 4 through a FDL (fixed delay line) 5. The FDL 5 causes further delay for one half-period of the phase of the chroma signal for the chroma signal phase is inverted for one horizontal sync period due to frequency interleaving in the video signal of the NTSC system. Thus, phase match of the chroma signal can be obtained at the time of compensation for drop-out, thus permitting compensation for up to the color range.

From the output side of variable delay 6, the video signal's color burst signal is extracted. A burst phase error detector which compares the phase of this burst signal with, for instance, reference signal generator 16 and converts the phase difference thus obtained to a corresponding voltage is set up. Of the burst phase error voltage obtained from burst phase error detector 14, only the AC component is coupled through coupling capacitor Cc to the other input terminal 11b of adder 11. Burst phase error detector 14, coupling capacitor Cc, adder 11, VCO 12, driver 13 and variable delay 6 constitute a loop circuit which forms a fine time-axis error compensator for affecting time-axis error compensation up to the phase precision of the burst signal.

With this fine time-axis error compensator, time-axis error compensation can be obtained independently of the multiplex closed loop servo system for the spindle motor and tangential mirror, respectively controlled by the frequency error signal and horizontal phase error signal to be described later, and thus the whole system can be stabilized. Thus, it is possible to eliminate the influence of variaous external disturbances and obtain high quality image reproduction.

Further, the output side of horizontal sync separator 7 is connected to frequency and phase error detector 17 which detects each error of reference signal generator 16 to reference frequency and phase frequency and a horizontal sync error signals, one each, are fed to a video disk spindle motor servo system and a tangential mirror servo system to compensate rough time-axis errors. Time-axis compensation is made including horizontal sync signal timing precision for the video signal demodulated by video FM demodulator 1, therefore, fine time-axis compensation servo can be achieved in variable delay 6 paying attention to phase errors of color burst.

As described earlier, a control signal for compressing the time-axis error of a large variable range is applied to the multiplex closed loop system for the spindle motor and tangential mirror. Thus, sufficient time-axis error compensation of the detected FM signal supplied from the audio FM demodulator 3 is performed. Therefore, the demodulated audio signal obtained from audio FM demodulator 3 contains substantially no wow or flutter component and, also, there is no superimposed noise during the vertical blanking period, so that satisfactory sound reproduction can be achieved.

As has been described in the foregoing, with apparatus for reproducing a video signal by detecting a video signal recorded on a recording medium while rotating the rotary recording medium according to the present invention, in which a variable delay for inputting and delaying the detected video signal, a phase comparator for comparing each phase of horizontal sync signals obtained from input and output sides of the variable delay, and a voltage controlled oscillator for controlling the delay period of the variable delay to a constant value receiving the comparator output, are provided, the time-axis of the demodulated video signal can itself be used as reference. Thus, a high-precision delay period, for instance, can be set to 1H period. In this case, a delay period to be set is always correct, even if a variable delay contains an uncertain delay element, for instance, a filter or the like. Therefore, an apparatus with stable operation can be provided. Also, variable delay can be simplified, as it is not necessary to increase the number of delay stages of a variable delay to extend a delay period. Further, a delay period is always set correctly, thus, it is not necessary to set up various devices for compensating a delay period. Therefore, simplification and, further, cost reduction of the apparatus is feasible as a whole.

What is claimed is:

1. An apparatus for reproducing a video signal, comprising:
   a video FM demodulator for demodulating a video FM signal detected from a video information recording medium for reproducing a video signal;
   a variable delay provided after said video FM demodulator for delaying said video signal;
   a first horizontal sync separator for separating horizontal sync signals from said video signal which is to be inputted to said variable delay;
   a second horizontal sync separator for separating horizontal sync signals from said video signal which has been outputted from said variable delay;
   a phase comparator which receives the output of said first and second horizontal sync separators for comparing the respective phases of said horizontal sync signals outputted from said first and second horizontal sync separators and producing a phase-error voltage; and
   a voltage controlled oscillator controlled by said phase-error voltage, for controlling said variable delay so as to keep the delay time of said variable delay at 1H.

* * * * *